(12) United States Patent
Cardwell, III

(10) Patent No.: US 11,913,497 B2
(45) Date of Patent: Feb. 27, 2024

(54) RADIALLY-NESTED BEARING ASSEMBLY

(71) Applicant: AKTIEBOLAGET SKF, Gothenburg (SE)

(72) Inventor: John Elliot Cardwell, III, Harleysville, PA (US)

(73) Assignee: AKTIEBOLAGET SKF, Gothenburg (SE)

(*) Notice: Subject to any disclaimer, the term of this patent is extended or adjusted under 35 U.S.C. 154(b) by 39 days.

(21) Appl. No.: 17/741,058

(22) Filed: May 10, 2022

(65) Prior Publication Data

US 2023/0366433 A1 Nov. 16, 2023

(51) Int. Cl.
*F16C 33/58* (2006.01)
*F16C 19/36* (2006.01)

(52) U.S. Cl.
CPC ............ *F16C 33/585* (2013.01); *F16C 19/36* (2013.01)

(58) Field of Classification Search
CPC ........ F16C 19/18; F16C 19/181; F16C 19/36; F16C 19/38; F16C 19/383; F16C 19/385; F16C 33/585; F16C 2229/00
See application file for complete search history.

(56) References Cited

U.S. PATENT DOCUMENTS

| | | | |
|---|---|---|---|
| 4,834,560 A | 5/1989 | Jacob et al. | |
| 5,074,680 A | 12/1991 | Hoch et al. | |
| 5,820,272 A * | 10/1998 | Nashiki | B23Q 11/0003 384/493 |
| 6,418,192 B1 * | 7/2002 | Ratzmann | F16C 19/55 378/119 |
| 8,105,053 B2 * | 1/2012 | Ueno | F16C 19/55 417/373 |
| 8,579,512 B2 * | 11/2013 | Radinger | H02K 7/003 384/473 |
| 9,261,137 B2 * | 2/2016 | Kullin | F16C 25/083 |
| 2009/0067768 A1 * | 3/2009 | Ueno | F16C 19/181 384/512 |
| 2016/0003299 A1 | 1/2016 | Meyer | |

FOREIGN PATENT DOCUMENTS

| | | |
|---|---|---|
| DE | 7529863 U | 9/1975 |
| DE | 3725642 A1 | 2/1989 |
| DE | 102008008192 A1 | 8/2009 |

(Continued)

*Primary Examiner* — James Pilkington
(74) *Attorney, Agent, or Firm* — J-TEK LAW PLLC; Scott T. Wakeman; Mark A. Ussai

(57) ABSTRACT

A bearing assembly includes a housing having an annular recess, an inner ring disposed within the recess and having an inner raceway, and an outer ring disposed about the inner ring and within the housing recess and having an outer raceway. At least one intermediate ring is disposed radially between the inner ring and the outer ring and has an inner intermediate raceway and an outer intermediate raceway. A first set of rolling elements is disposed between the inner ring and the at least one intermediate ring and a second set of rolling elements is disposed between the outer ring and the at least one intermediate ring. A biasing member(s) is configured to bias the inner ring or the outer ring axially toward the other one of inner ring and the bearing outer ring so as to establish a preload within the two sets of rolling elements.

20 Claims, 14 Drawing Sheets

(56) References Cited

FOREIGN PATENT DOCUMENTS

| DE | 102020122309 | A1 | 3/2022 |
|----|--------------|----|--------|
| FR | 2853028 | A1 | 10/2004 |
| WO | 2010037370 | A1 | 4/2010 |
| WO | 2010037372 | A1 | 4/2010 |
| WO | 2011018313 | A1 | 2/2011 |

* cited by examiner

RADIALLY-NESTED BEARING ASSEMBLY

BACKGROUND OF THE INVENTION

The present invention relates to rolling element bearings, and more particularly to rolling element bearings having radially-spaced sets of rolling elements.

Rolling element bearings including two or more radially spaced sets of rolling elements are known and are sometimes referred to as being "radially-nested". Such bearings typically include an inner ring, an outer ring and at least one intermediate ring disposed radially between the inner and outer rings. A first set of rolling elements is disposed between the inner ring and the intermediate ring and a second set of rolling elements is disposed between the outer ring and the intermediate ring. Due to the limitations of presently known "radially-nested" bearings, these bearings are typically limited to supporting radial loading alone or only minimal axial loading.

SUMMARY OF THE INVENTION

In one aspect, the present invention is a bearing assembly for movably coupling a first member and a second member and disposed within an annular space at least partially defined by a housing having a central axis. The bearing assembly comprises a bearing inner ring disposed within the annular space and having an inner raceway and a bearing outer ring is disposed about the inner ring and within the annular space, the bearing outer ring having an outer raceway. At least one bearing intermediate ring is disposed radially between the bearing inner ring and the bearing outer ring and has an inner intermediate raceway and an outer intermediate raceway. A first set of rolling elements is disposed between the bearing inner ring and the at least one bearing intermediate ring so as to be rollable along the inner raceway and the inner intermediate raceway. Also, a second set of rolling elements is disposed between the bearing outer ring and the at least one bearing intermediate ring so as to be rollable along the outer raceway and the outer intermediate raceway. Further, at least one biasing member is configured to bias a movable one of the bearing inner ring and the bearing outer ring generally axially toward the other one of the bearing inner ring and the bearing outer ring so as to establish a preload within at least one of the first set of rolling elements and the second set of rolling elements.

In another aspect, the present invention is a bearing assembly as described in the preceding paragraph and further comprising an annular housing with a first axial end, a second axial end spaced apart along the central axis and an annular recess extending axially from the first axial end and toward the second axial end and providing the annular space. Also, the bearing assembly further comprises a retainer connected with the housing and configured to retain the at least one biasing member within the annular recess of the housing.

In a further aspect, the present invention is again a bearing assembly as recited in the first paragraph of this Summary of the Invention section and further in which each bearing ring has at least one frustoconical circumferential surface. Specifically, the bearing inner ring has a frustoconical outer circumferential surface and the inner raceway is provided by the frustoconical outer circumferential surface or an annular groove extending radially inwardly and axially from the frustoconical outer surface. The bearing outer ring has a frustoconical inner circumferential surface and the outer raceway is provided by the frustoconical inner surface an annular groove extending radially outwardly and axially from the frustoconical inner surface. Further, the at least one bearing intermediate ring has a frustoconical inner circumferential surface and a frustoconical outer surface, the inner intermediate raceway is provided by the frustoconical inner surface or an inner groove extending radially outwardly and axially from the frustoconical inner surface and the outer intermediate raceway is provided by the frustoconical outer circumferential surface or an outer groove extending radially inwardly and axially from the frustoconical inner surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
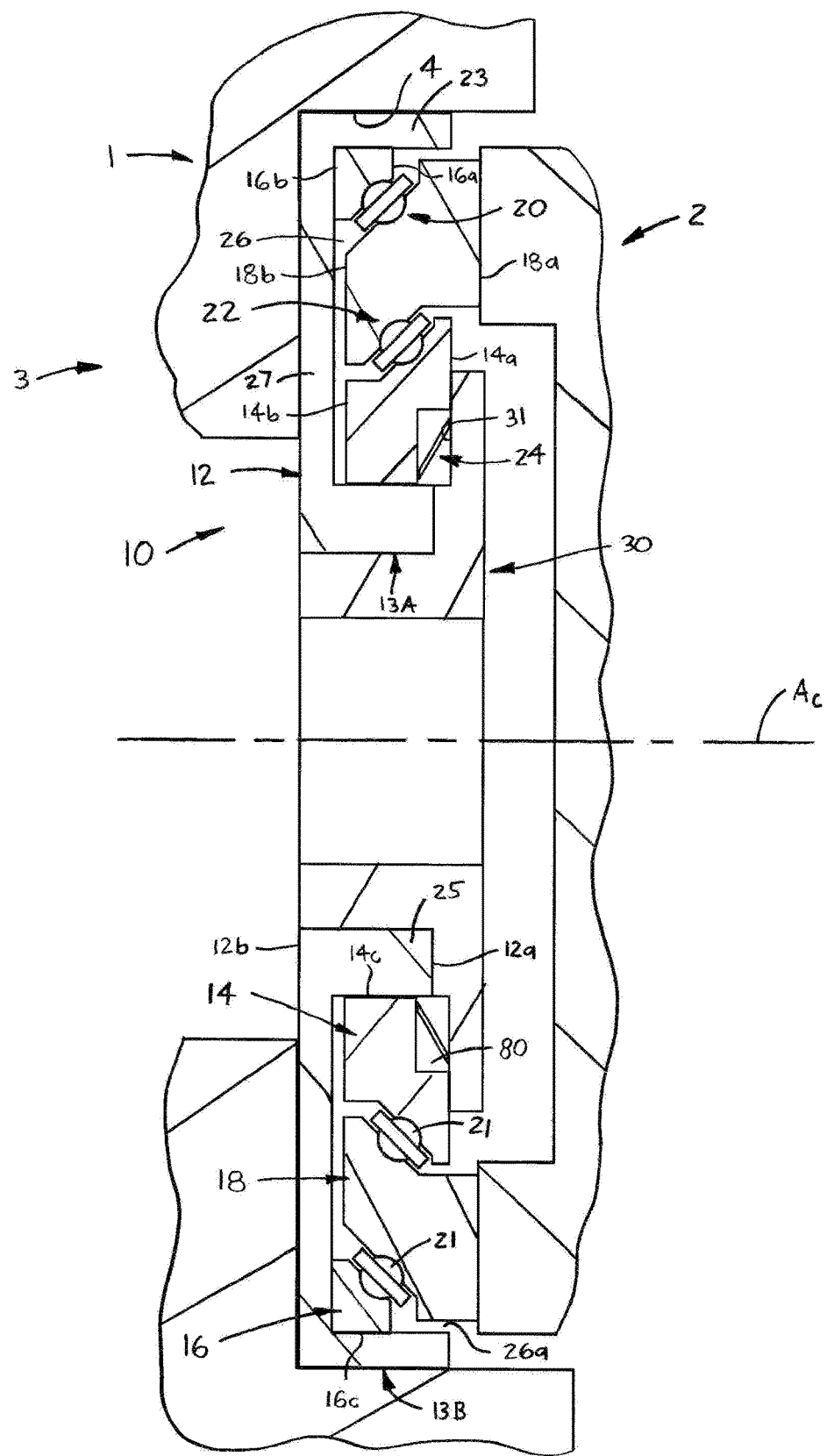
FIG. 1 is a partly broken-away, axial cross-sectional view of a mechanical assembly including a bearing assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-14 a radially-nested bearing assembly 10 for a variety of applications, one presently preferred application being to movably couple a first member 1 and second member 2 of a mechanical assembly 3, which is preferably a robotic arm or tool assembly, such that at least one of the two members 1, 2 is angularly displaceable relative to the other member 2, 1. However, the bearing assembly 10 may be utilized in any other desired application and may be incorporated into any appropriate machine or mechanical assembly 3. In any case, the bearing assembly 10 preferably comprises a housing 12, a bearing inner ring 14, a bearing outer ring 16, at least one bearing intermediate ring 18, a first set 20 of rolling elements 21, a second set 22 of rolling elements 21 and at least one biasing member 24 or 90 (FIG. 14).

More specifically, the housing 12 has a central axis $A_C$ and an annular recess 26 extending circumferentially about the central axis $A_C$, and preferably includes a central bore 28 as described below. The bearing inner ring 14 is disposed within the annular recess 26 and has an inner raceway 15 and the bearing outer ring 16 is disposed about the inner ring 14, and thus also within the recess 26, and has an outer raceway 17. Either the inner ring 14 or the outer ring 16 is movably disposed within the recess 26 so as to be axially displaceable (e.g., slidable along a circumferential surface of the housing 12), and the other ring 14, 16 is either fixedly disposed within the recess 26 or integrally formed with the housing 12. Further, the at least one bearing intermediate ring 18 is disposed radially between the inner ring 14 and the outer ring 16 and has both an inner intermediate raceway 19A and an outer intermediate raceway 19B.

The first set 20 of rolling elements 21 is disposed between the inner ring 14 and the at least one bearing intermediate ring 18 so as to be simultaneously rollable along the inner raceway 15 and the inner intermediate raceway 19A, thus angularly displaceably coupling the rings 14, 18. The second set 22 of rolling elements 21 is disposed between the bearing outer ring 16 and the at least one bearing intermediate ring 18 so as to be rollable along the outer raceway 17 and the outer intermediate raceway 19B, similarly angularly displaceably coupling the rings 16, 18. In a presently preferred embodiment, each rolling element 21 is preferably a spherical element or "ball", but may be a tapered roller (FIG. 11), a cylindrical roller, a needle roller or any other type of rolling element, depending on the particular application and may be formed of any appropriate material. Furthermore, the at least one biasing member 24 is preferably compressible, has opposing axial ends 24a, 24b and is preferably formed as a spring, most preferably as a wave spring as shown in FIG. 2. However, the compressible biasing member(s) 24 may be formed in any other appropriate manner, such as for example, a single Bellville washer (FIGS. 1, 4 and 12), a plurality of circumferentially spaced coil springs (FIGS. 3 and 13), one or more elastomeric rings or cylinders (FIG. 11), etc. Regardless of the particular structure, the compressible biasing member 24 is configured to bias the movable one of the bearing inner ring 14 and the bearing outer ring 16 generally axially toward the other ring 16 or 14, and thus also axially toward the intermediate ring 18, and exerts an axial biasing force $F_B$ (FIG. 4) against the movable ring 14 or 16. Alternatively as described below, the bearing rings 14, 16 and 18 may be formed of a compressible material and the biasing member 90 is configured to bias the movable bearing ring 14 or 16 to establish preload by compressing the bearing raceways 15, 17, 19A and 19B.

Figure 7:
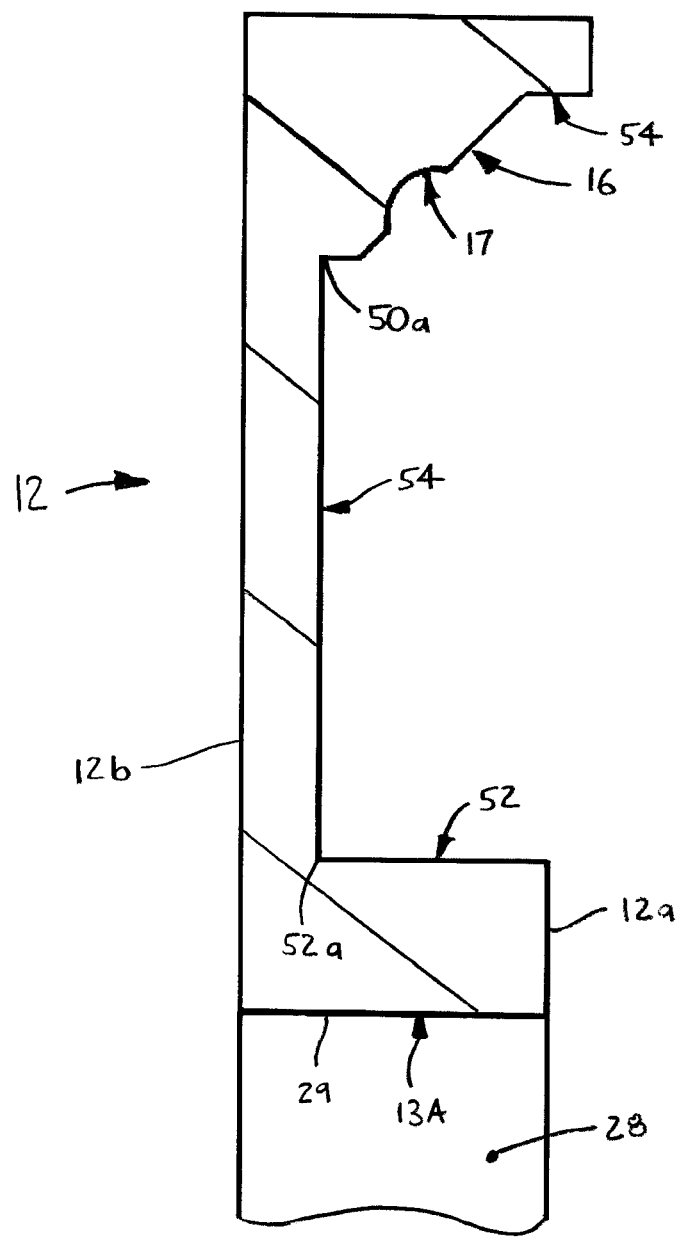
FIG. 7 is an axial cross-sectional view of an upper portion of an alternative housing, depicting an integral bearing outer ring.
Figure 8:
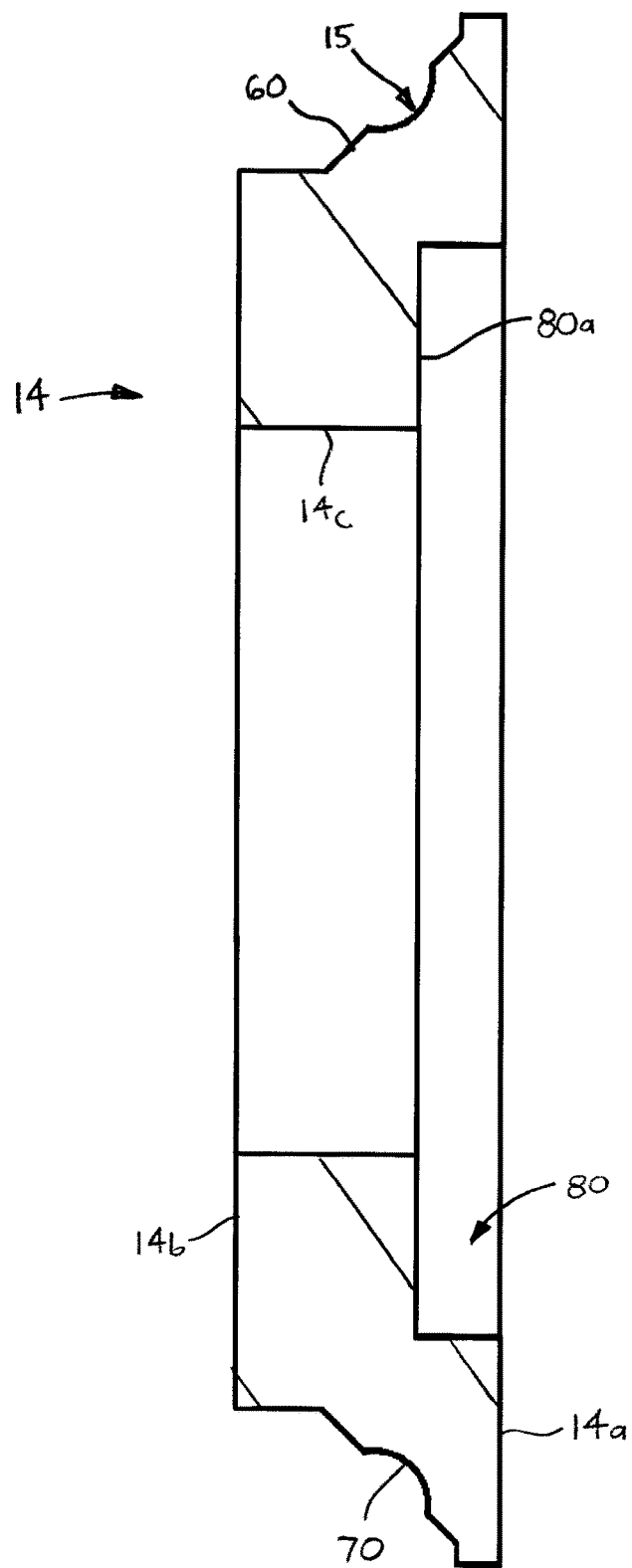
FIG. 8 is an axial cross-sectional view of a preferred bearing inner ring.
Figure 9:
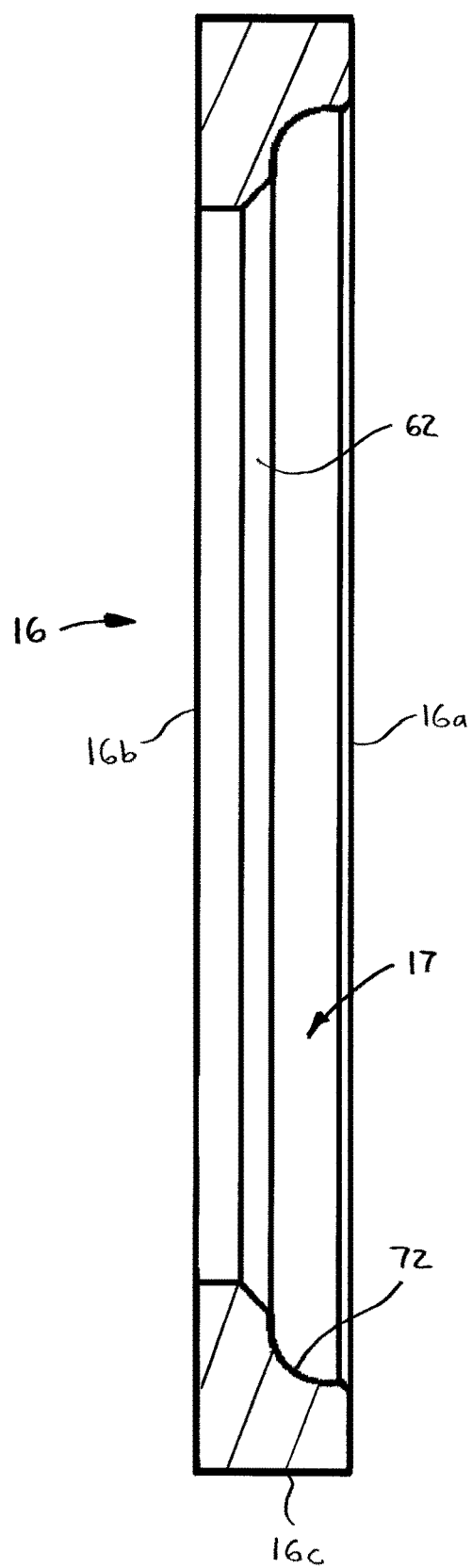
FIG. 9 is an axial cross-sectional view of a preferred bearing outer ring.
Figure 10:
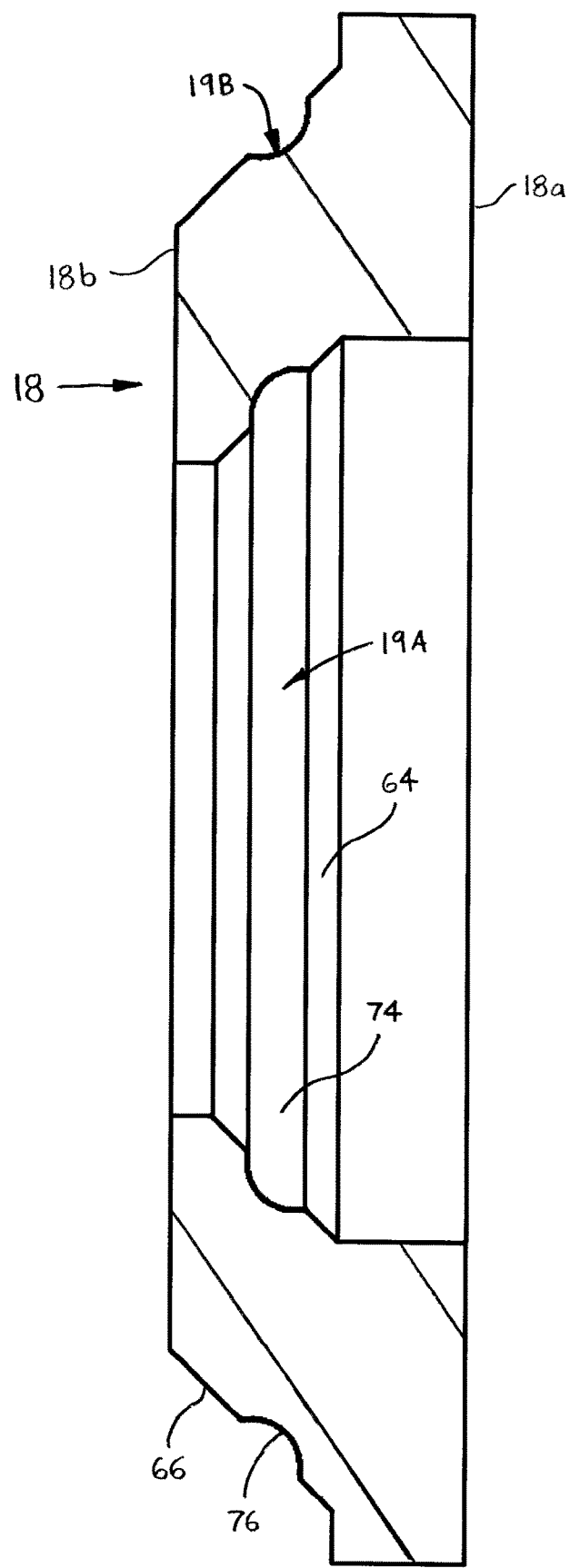
FIG. 10 is an axial cross-sectional view of a preferred bearing intermediate ring.

More specifically, in certain constructions as depicted in FIGS. 1-4, 11 and 13, the bearing inner ring 14 is movably disposed within the housing annular recess 26 and the bearing outer ring 16 is either fixedly disposed within the annular recess 26 (FIGS. 1-4, 11 and 13) or integrally formed with the housing 12 (FIG. 7). In such constructions, the at least one biasing member 24 is disposed against the bearing inner ring 14 and biases the inner ring 14 axially toward the bearing outer ring 16. In other constructions as shown in FIG. 12, the bearing outer ring 16 is movably disposed within the recess 26 and the bearing inner ring 14 is either fixedly disposed within the annular recess 26, as depicted, or integrally formed with the housing 12 (not depicted).

Figure 4:
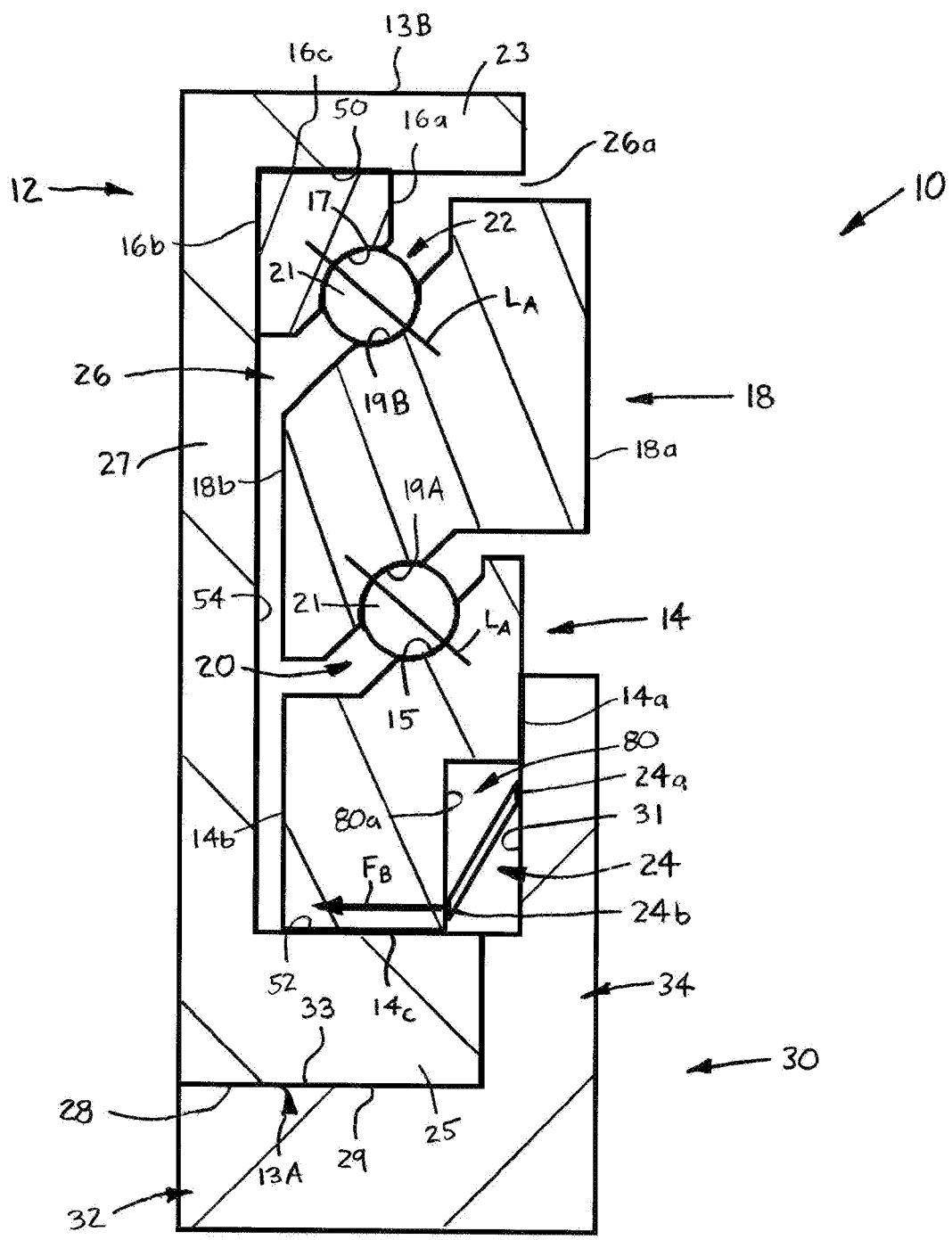
FIG. 4 is another view of the bearing assembly of FIG. 3, shown without bearing cages and depicting the line of action of the rolling elements.
Figure 5:
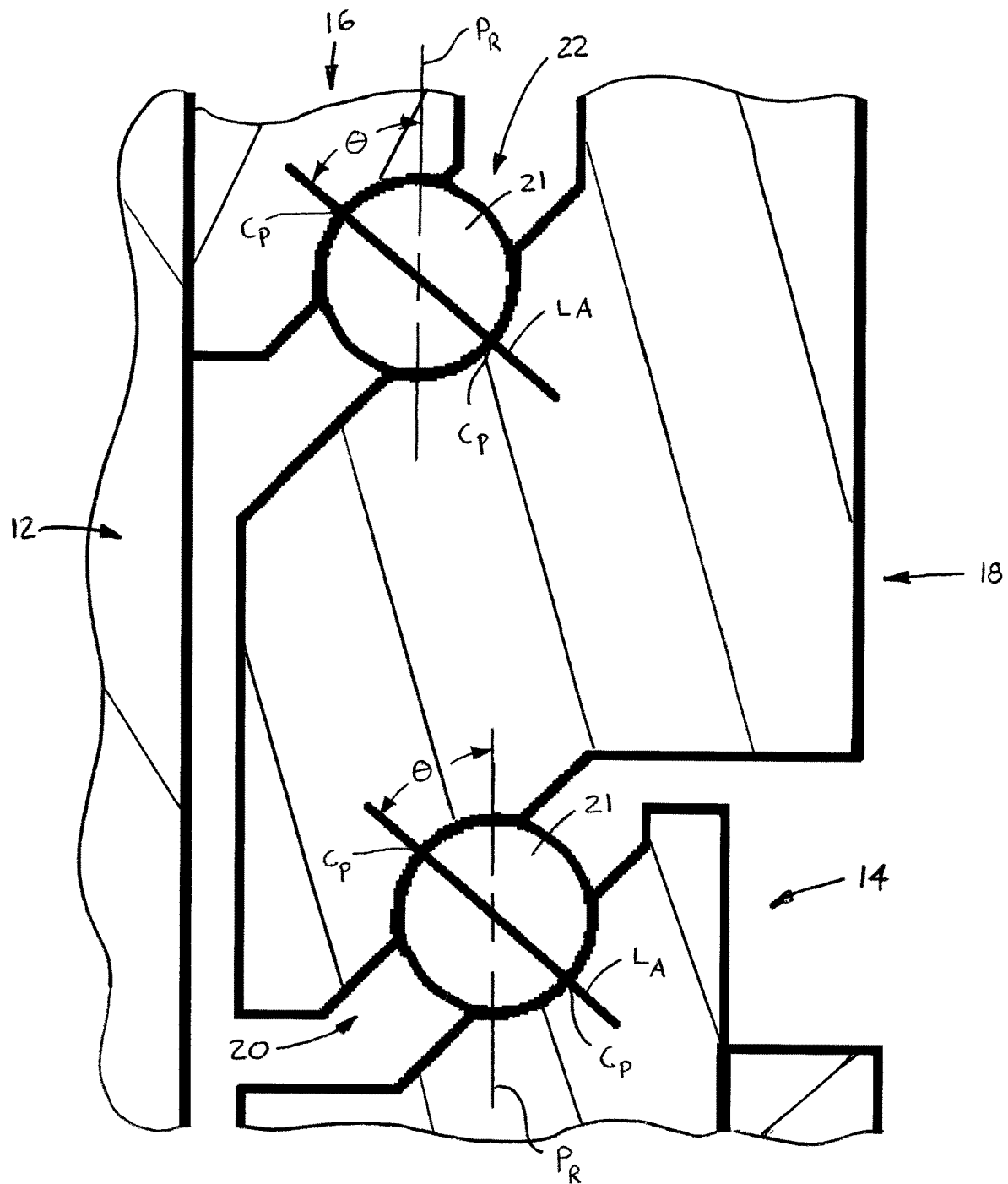
FIG. 5 is a broken-away, enlarged view of a portion of FIG. 4, indicating the contact points and contact angle of each line of action.
Figure 13:
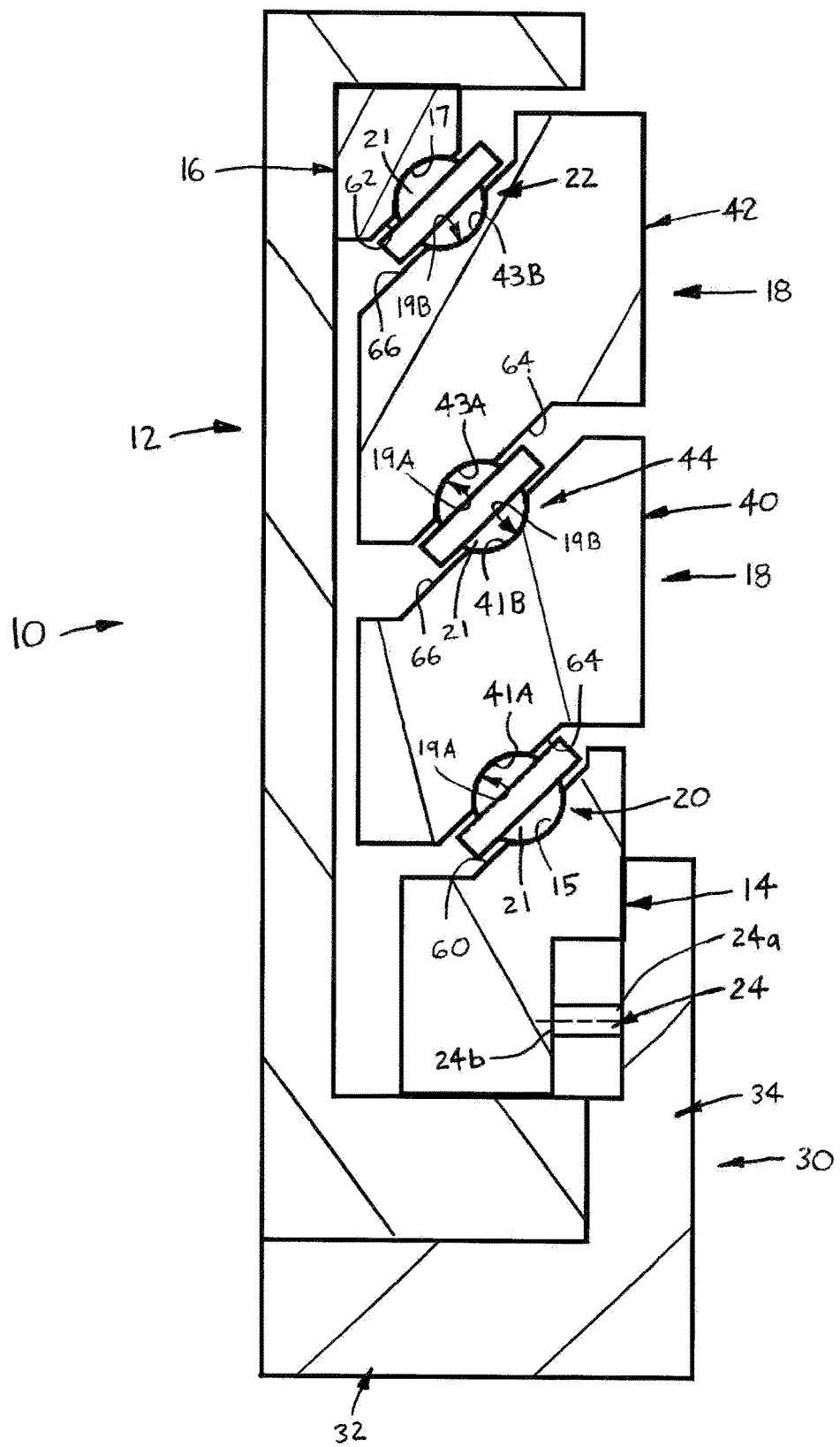
FIG. 13 is another axial cross-sectional view of the bearing assembly, shown with two bearing intermediate rings.
Figure 14:
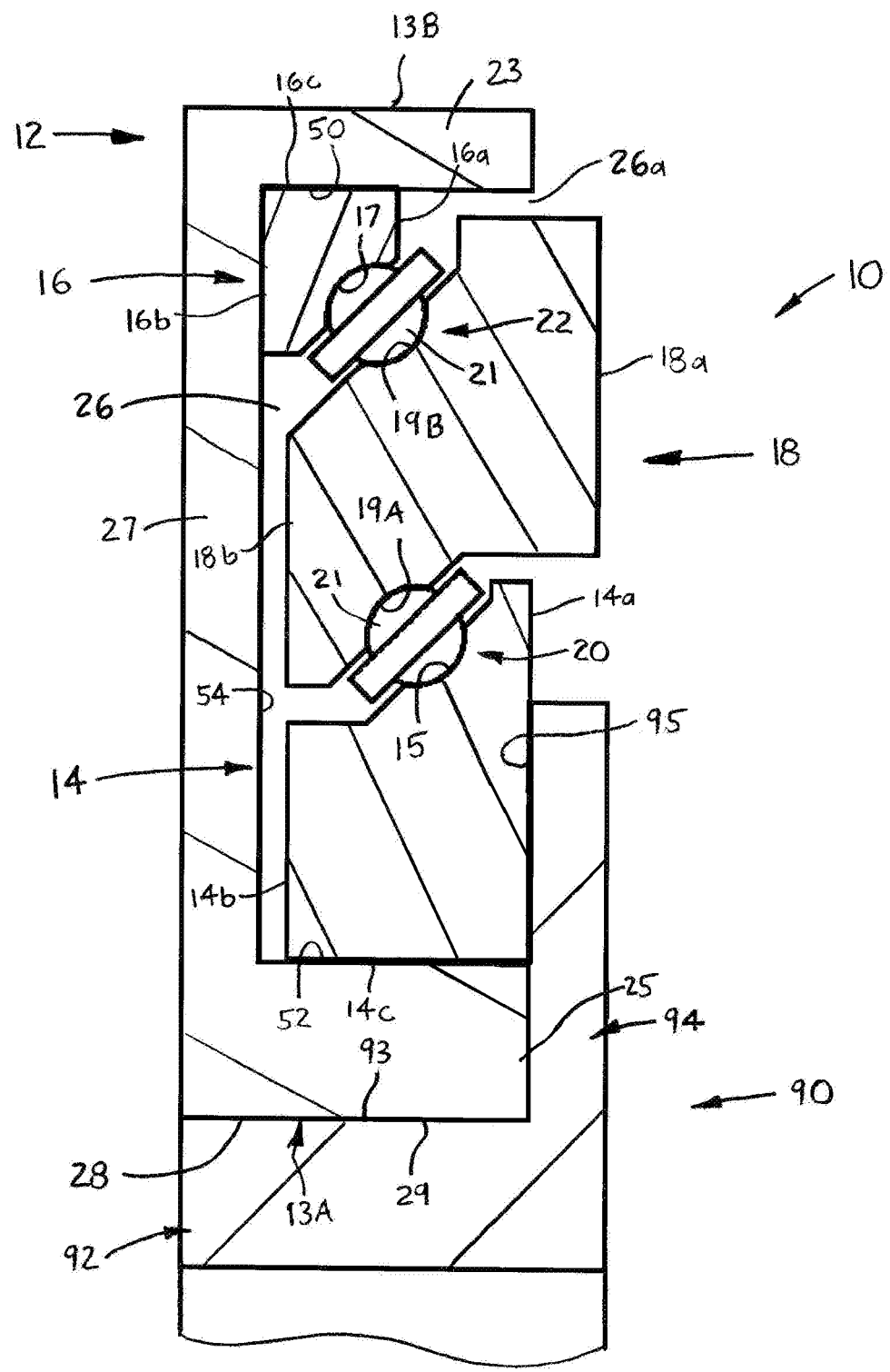
FIG. 14 is an axial cross-sectional view of an alternative bearing assembly including a biasing retainer.

Referring to FIGS. 4, 5 and 13, in any of the above cases, the axial biasing or displacement of the one movable ring 14, 16 toward the other, fixed ring 16, 14 establishes a preload within the first set 20 of rolling elements 21 and a preload within the second set 22 of rolling elements 21, and if applicable, within a third rolling element set 44 or additional sets as discussed below. Specifically, the retainer 24 exerts the axial biasing force $F_B$ (FIG. 4) on the movable inner ring 14 or movable outer ring 16 and the axial biasing of the ring 14 or 16 establishes a line of contact or "line of action" $L_A$ through the contact point $C_P$ of each rolling element 21 in all of the rolling element sets 20, 22 and 44 and each of the pairs of raceways 15/19A, 17/19B and 41B/43A, respectively, upon which rolls each rolling element set 20, 22 and 44. The line of action $L_A$ extends at an acute angle θ greater than zero degrees (0°) with respect to each radial plane $P_R$ through the bearing assembly 10, as indicated in FIG. 5, such that the bearing assembly 10 is capable of supporting both radial and axial loading.

Further, the bearing assembly 10 preferably further comprises a retainer 30 connected with the housing 12 and configured to retain the at least one biasing member 24 within the housing recess 26, and thus providing a stop or support surface 31 against which pushes the biasing member 24. Preferably, the housing central bore 28 has a threaded inner circumferential surface 29 and the retainer 30 includes an annular portion 32 with a threaded outer circumferential surface 33 and a radial flange portion 34 providing the radial stop surface 31. With this structure, the retainer threaded outer surface 33 is threadably engaged with the threaded inner circumferential surface section 29 of the housing 12 to adjustably connect the retainer 30 with the housing 12, such that the preload in the bearing assembly 10 is variable. Specifically, the preload within each bearing set 20, 22 and 44 increases when the retainer annular portion 32 is axially advanced into the housing bore 28 and the preload alternatively decreases when the annular portion 32 is by axially displaced outwardly from the bore 28.

Also, the first axial end 24a of each biasing member 24 is disposed against the retainer stop surface 31 and each biasing member second axial end 24b is disposed against the movable one of the bearing inner ring 14 and the bearing outer ring 16, which is preferably the inner ring 14 with this retainer structure. That is, when the retainer 30 is configured to connect with the housing bore 28, the flange portion 34 extends outwardly a sufficient radial distance to axially contain at least a portion of the bearing inner ring 14, but does not obstruct the majority of the recess open end 26a to enable connection of the bearing intermediate ring(s) 18 with one or more second members 2.

Referring specifically to FIG. 12, the retainer 30 may alternatively be sized and formed with an annular portion 32 threadably engaged with an outer circumferential surface 13B of the housing 12 and having a radially inwardly extending radial flange 34 that retains a movable bearing outer ring 16. However, the retainer 30 may be formed in any other appropriate manner that is capable of retaining one or more biasing members 24. Further, the bearing assembly 10 may be fabricated without a separate retainer member and may instead have a housing 12 with a radial shoulder or other structure (none shown) that is formed to retain an axial end 24a of the retainer 24, and thereby the movable ring 14 or 16.

Referring now to FIGS. 1-4 and 11-13, in a presently preferred construction, the bearing assembly 10 includes the inner and outer rings 14, 16 and a single intermediate ring 18, as shown in FIGS. 1-4, 11 and 12. In one alternative construction shown in FIG. 13, the at least one bearing intermediate ring 18 includes both a first bearing intermediate ring 40 and a second bearing intermediate ring 42 disposed about the first intermediate ring 40. Specifically, the first bearing intermediate ring 40 includes a first inner intermediate raceway 41A and a first outer intermediate raceway 41B, with the first set 20 of rolling elements 21 being disposed between the first bearing intermediate ring 40 and the bearing inner ring 14. The second bearing intermediate ring 42 includes a second inner intermediate raceway 43A and a second outer intermediate raceway 43B, the second set 22 of rolling elements 21 being disposed between the second bearing intermediate ring 42 and the bearing outer ring 16. Further, a third set 44 of rolling elements 21 is disposed between the first intermediate bearing ring 40 and the second bearing intermediate ring 42 so as to be rollable along the first outer intermediate raceway 41B and the second inner intermediate raceway 43A.

With this alternative structure, the axial biasing of the movable one of the bearing inner ring 14 and the bearing outer ring 16 also establishes a preload within the third set 44 of rolling elements 21, i.e., within all three sets 20, 22 and 44 of rolling elements 21. Further, the bearing assembly 10 may include a third intermediate bearing ring (not shown) or any other desired number of intermediate bearing rings 18, and in each case, the at least one biasing member 24 will establish a desired preload within all of the sets 20, 22, 44, etc. of rolling elements 21 by biasing the movable inner ring 14 or the movable outer ring 16.

Figure 2:
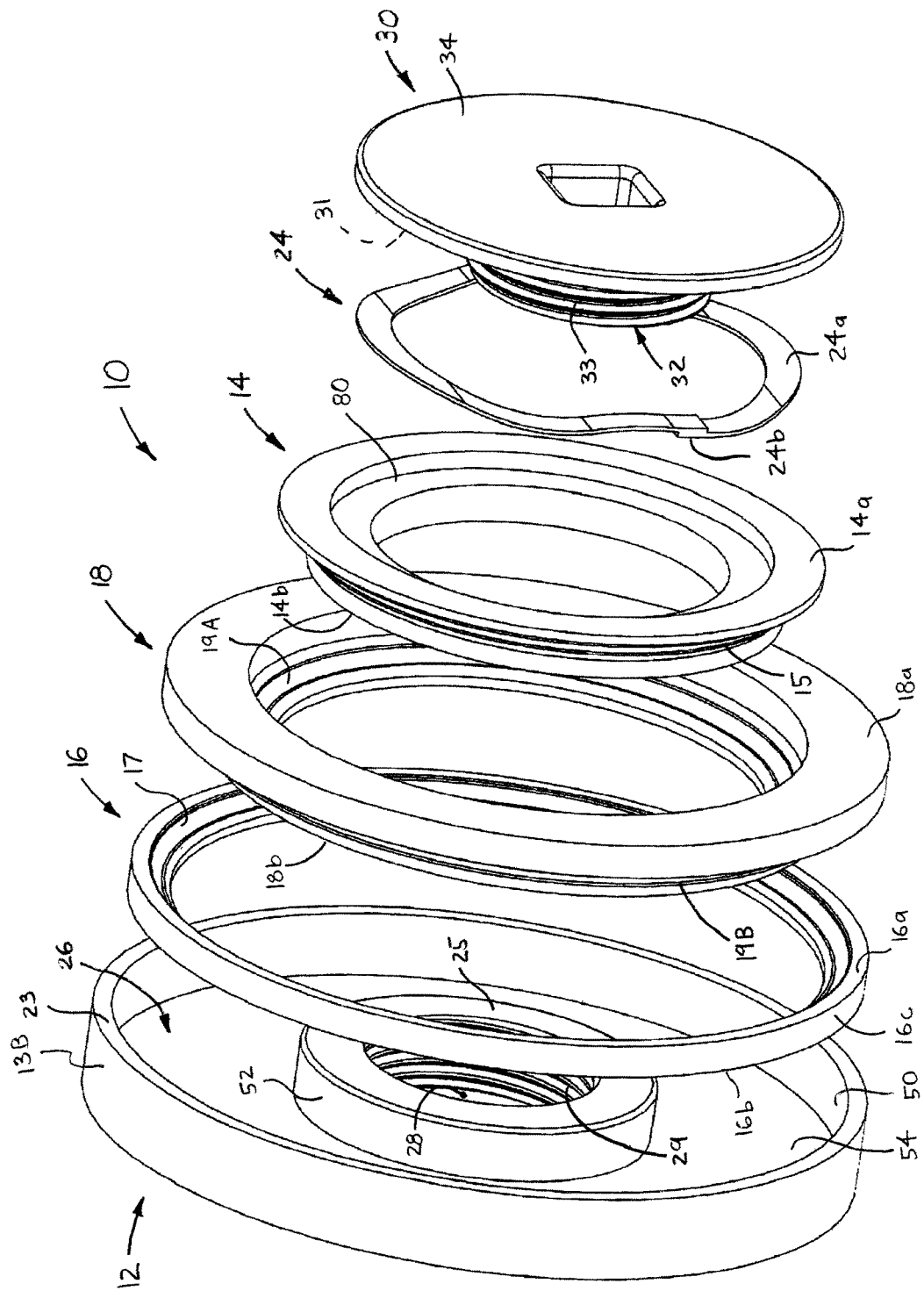
FIG. 2 is an exploded, perspective view of the bearing assembly.
Figure 3:
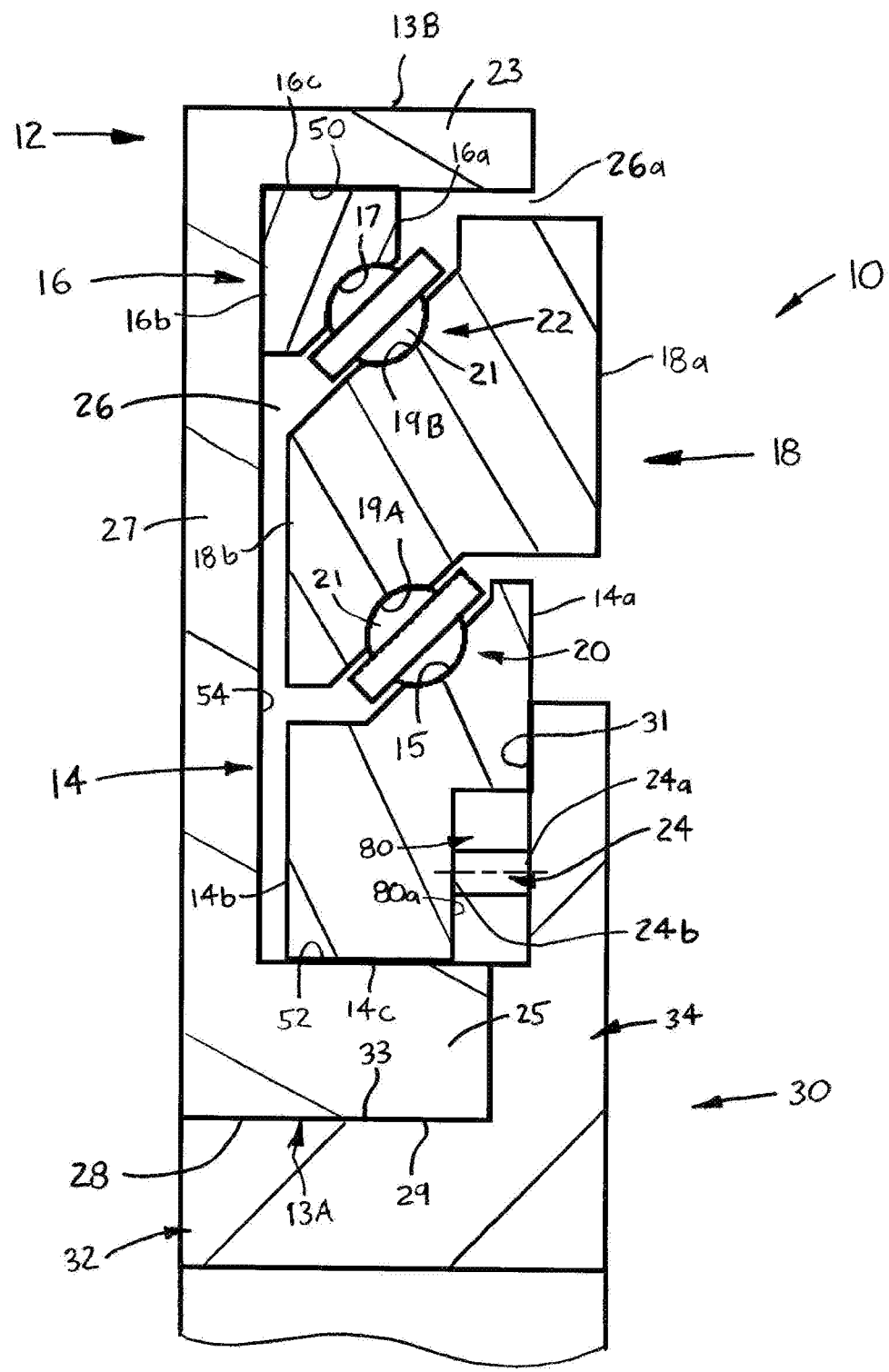
FIG. 3 is an enlarged axial cross-sectional view of an upper portion of the bearing assembly.

Referring particularly to FIG. 1, with the basic structure described above, the housing 12 is configured to connect with or is integrally formed with the first member 1. The at least one bearing intermediate ring 18 is configured to connect with or is integrally formed with the second member 2, such that either a portion of the bearing intermediate ring 18 or a portion of the second member 2 extends outwardly from the annular recess 26 of the housing 12. Further, either the bearing intermediate ring 18 or the housing 12 is angularly displaceable about the central axis $A_C$ of the housing 12, such as for example, to angularly displace a robotic arm or tool (none shown) connected with or integrally formed with the second member 2 relative to a "shoulder" providing or connected with the first member 1. However, the bearing assembly 10 may be used in any other appropriate application, for example, to support a continuously rotating second member 2 and/or a continuously rotating first member 1. Having described the basic components and functions above, these and other features of the present bearing assembly 10 are described in further detail below.

Figure 6:
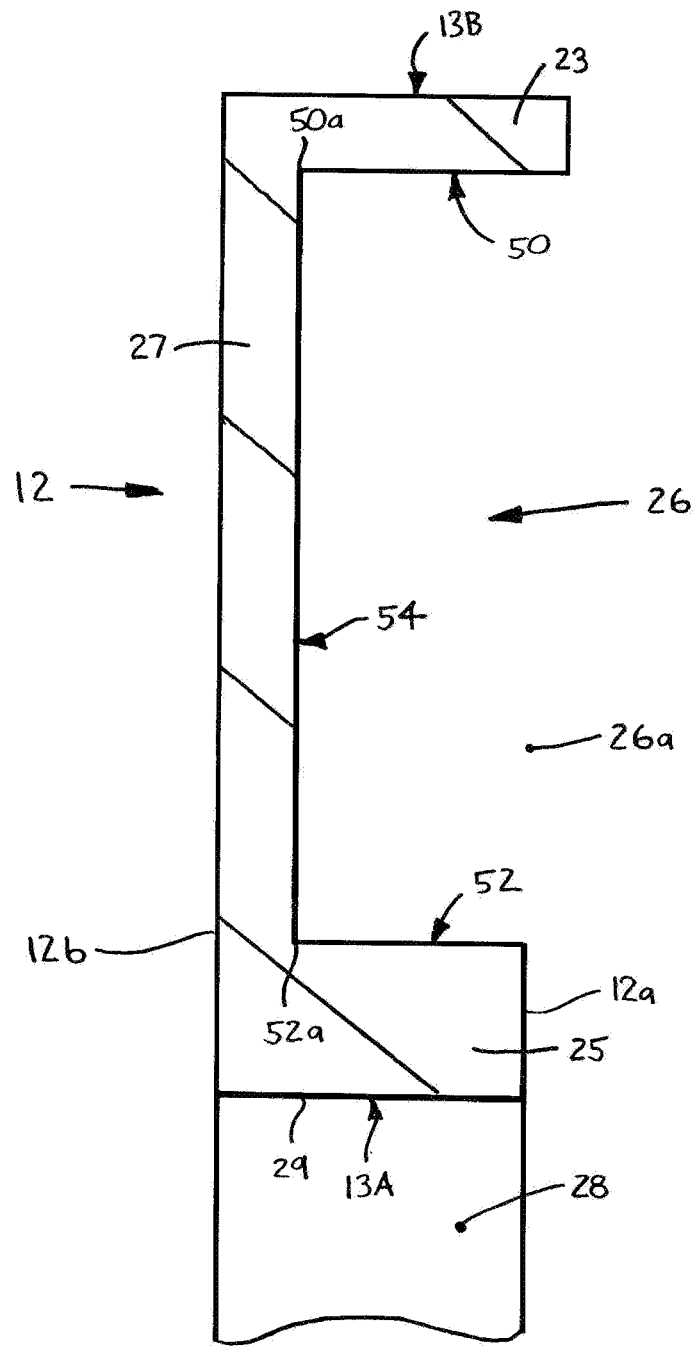
FIG. 6 is an axial cross-sectional view of an upper portion of a housing of the bearing assembly.

Referring now to FIGS. 1, 6 and 7, the housing 12 is preferably generally annular and has a first axial end 12a, an opposing second axial end 12b, an outer axial flange 23, a central hub 25 and a radial portion 27 extending between the flange 23 and the hub 25. With this structure, the recess 26 extends axially inwardly from the first axial end 12a and towards the second axial end 12b. The housing 12 also has an inner circumferential surface 13A provided by the hub 25, which defines the central bore 28 includes the interior threaded surface section 29 as described above, and an outer circumferential surface 13B formed on the axial flange 23 and sized to be disposed within an annular socket or recess 4 (FIG. 1) of the first member 1. Further, the housing recess 26 is preferably formed with generally rectangular axial cross-sections and has an open axial end 26a at the housing first axial end 12a.

Specifically, the housing recess 26 is preferably defined by an inward-facing circumferential surface section 50 extending axially from the housing first axial end 12a, an outward-facing circumferential surface section 52 extending axially from the first axial end 12a and a radial surface 54 extending between an inner edge 50a of the inward-facing circumferential surface section 50 and an inner edge 52a of the outward-facing circumferential surface section 52. By providing such as housing structure, the bearing rings 14, 16 and 18, the rolling element sets 20, 22 and 44 and the biasing member 24 may be preinstalled within the housing 12, such that the bearing assembly 10 may be provided as a unitary assembly that is installed as an integral or complete device within a desired mechanical assembly 3. However, the housing 26 may have an "open" inner radial end, and thus formed without the central hub 25, such that the recess 26 is partially defined by a shaft or an annular member disposed on a shaft (neither shown), with the bearing inner ring 14 being slidably or fixedly disposed on the shaft/annular member. Further, the recess 26 may be formed in any other appropriate manner, such as for example, having two open axial ends, a stepped or angled radial surface 54, etc. (no alternatives shown), or the bearing assembly 10 may be disposed within an annular space (not indicated) as least partially defined by the housing 12 or the first member 1, as long as the bearing assembly 10 is capable of functioning generally as described herein.

Furthermore, although the housing 12 is preferably annular and separate from the first member 1, the housing 12 may be formed in any other appropriate manner or/and be integrally formed with the first member 1. For example, the housing 12 may be formed as a generally rectangular block or complex-shaped block with the annular recess 26, as an integral end of a "shoulder" of a robotic arm assembly, etc. The scope of the present bearing assembly 10 is in no manner limited by the specific structure of the housing 12 and includes all housing constructions which enable the bearing assembly 10 to function generally as described herein.

Referring now to FIGS. 8-11, in a presently preferred construction, each one of the bearing rings 14, 16 and 18 has at least one frustoconical or "tapered" surface providing or at least orienting the one or more raceways of the particular ring. Specifically, the bearing inner ring 14 has a frustoconical outer circumferential surface 60, the outer bearing ring 16 has a frustoconical inner circumferential surface 62, and each intermediate ring 18 has both a frustoconical inner circumferential surface 64 and a frustoconical outer circumferential surface 66. The frustoconical surfaces 60, 62, 64 and 66 provide the "mating" raceways 15/19A, 17/19B or 15/41A, 17/43B and 41B/43A, i.e., the raceways which cooperate to retain and guide each set 20, 22 or 44 of rolling elements 21, are generally facing and spaced apart both axially and radially. As such, the frustoconical circumferential surfaces 60, 62, 64 and 66 enable the contact angle θ to have a greater value, thereby increasing the ability of the bearing assembly 10 to support axial loading (i.e., to support forces generally along the central axis $A_C$).

In the above-described presently preferred construction in which the rolling elements 21 are "balls", each ring 14, 16 and 18 further includes at least one annular groove 70, 72, or 74 and 76, respectively, providing the raceways 15, 17, 19A and 19B. Specifically, the inner bearing ring 14 has an annular groove 70 extending radially inwardly and axially from the frustoconical outer circumferential surface 60 and providing the bearing inner raceway 15. The bearing outer ring 16 has an annular groove 72 extending radially outwardly and axially from the frustoconical inner circumferential surface 62 and providing the bearing outer raceway 17. Further, each bearing intermediate ring 18 has an inner groove 74, the inner groove 74 extending radially outwardly and axially from the frustoconical inner circumferential surface 64 and providing the inner intermediate raceway 19A, and an outer groove 76 extending radially inwardly and axially from the frustoconical outer circumferential surface 66 and providing the outer intermediate raceway 19B.

With this construction, each ball rolling element 21 of the first rolling element set 20 is partially disposed in both the groove 70 of the inner ring 14 and the inner groove 74 of the intermediate ring 18. Also, each ball rolling element 21 of the second rolling element set 22 is partially disposed in both the groove 72 of the outer ring 16 and the outer groove 76 of the intermediate ring 18. Further, when the bearing assembly 10 includes two intermediate bearing rings 40, 42 and a third set 44 of rolling elements 21, each ball rolling element 21 is partially disposed in both the outer groove 76 of the first intermediate bearing ring 40 and the inner groove 74 of the second intermediate bearing ring 42.

Figure 11:
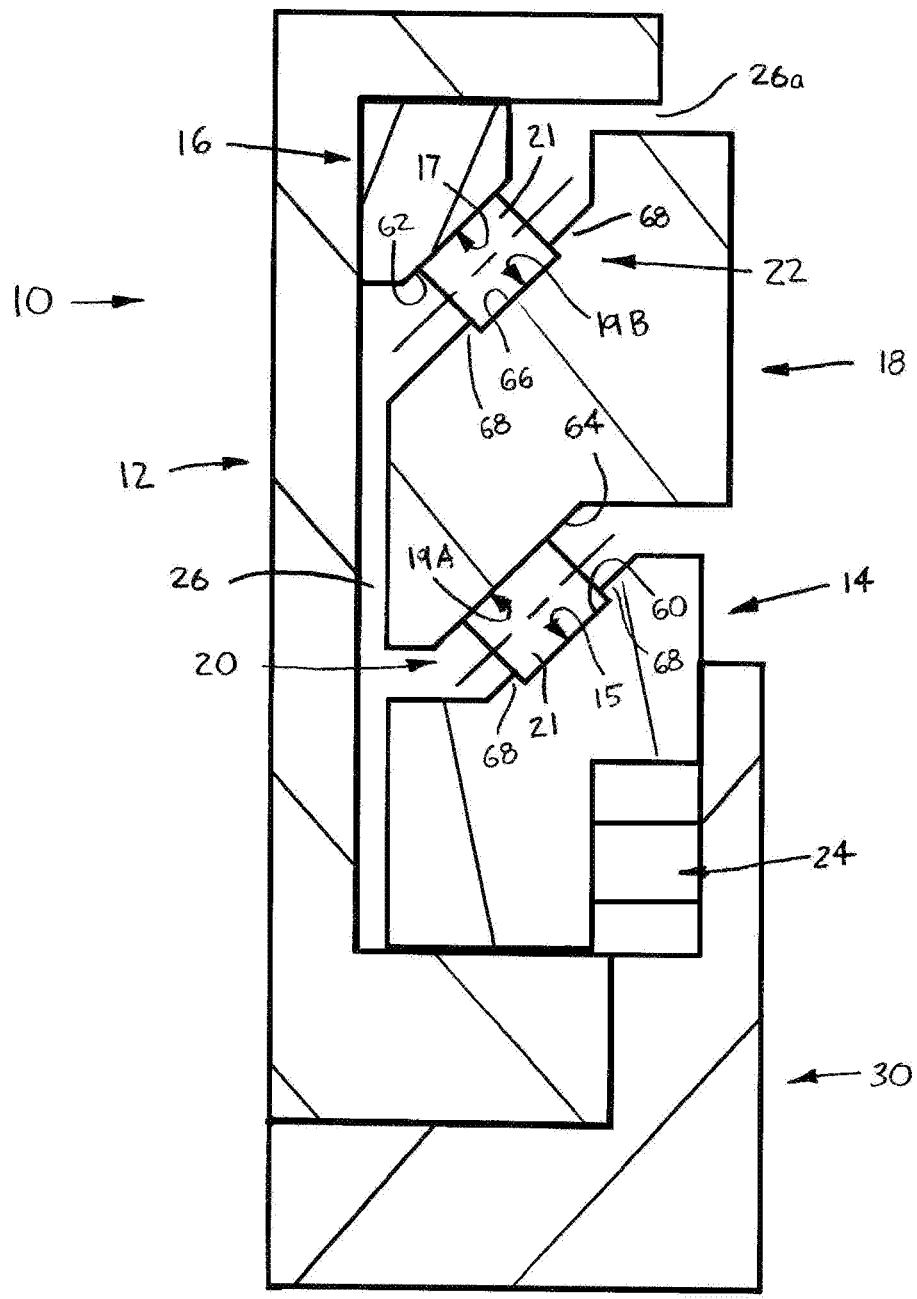
FIG. 11 is another axial cross-sectional view of the bearing assembly, shown with tapered rollers as rolling elements.
Figure 12:
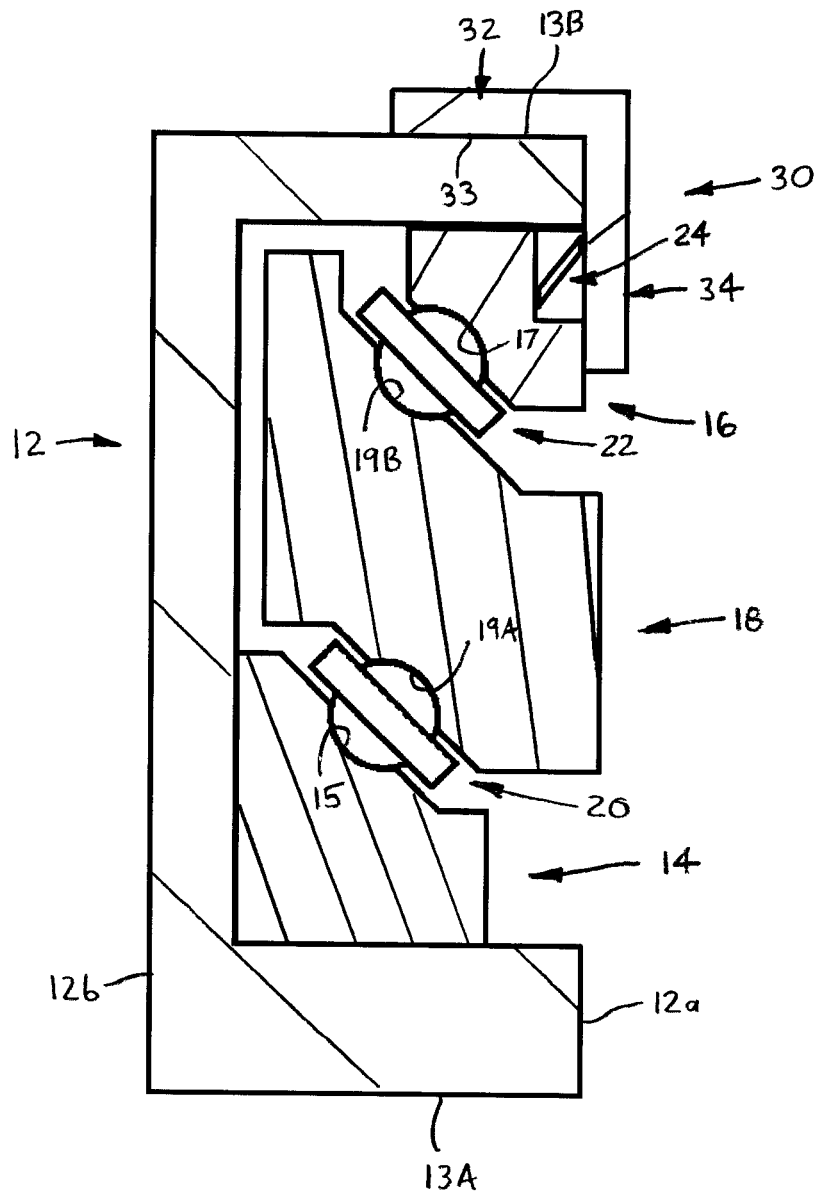
FIG. 12 is another axial cross-sectional view of the bearing assembly, shown with an alternative retainer structure.

Referring particularly to FIG. 11, in one alternative construction wherein the rolling elements 21 are tapered rollers, each frustoconical surface 60, 62, 64 and 66 provides the above-described raceways 15, 17, 19A and 19B, respectively, and the inner bearing ring 14 and each intermediate ring 18 further has a pair of shoulders 68, which extend radially outwardly and axially from each axial end of the outer circumferential surfaces 60 and 66, for retaining the rollers 21. With this construction, each roller rolling element 21 of the first rolling element set 20 rolls simultaneously upon the frustoconical outer surface 60 of the bearing inner ring 14 and the frustoconical inner surface 64 of the intermediate bearing ring 18. Also, each roller rolling element 21 of the second rolling element set 22 rolls simultaneously upon the frustoconical inner surface 62 of the bearing outer ring 14 and the frustoconical outer surface 66 of the intermediate bearing ring 18. Further, when there are two intermediate bearing rings 40, 42 and a third set 44 of rolling elements 21, each roller rolling element 21 of the third set 44 rolls simultaneously upon the frustoconical outer surface 66 of the first intermediate bearing ring 40 and the frustoconical inner surface 64 of the second intermediate bearing ring 42.

Referring now to FIGS. 1-4 and 8-10, with a presently preferred construction in which the bearing inner ring 14 is movable and the bearing outer ring 16 is fixed, the inner ring 14 preferably has opposing axial ends 14a, 14b, an inner circumferential surface 14c and an annular recess 80 extending axially from the first axial end 14a and radially outwardly from the inner surface 14c. The recess 80 provides space for installation of the at least one biasing member 24, such that the biasing member 24 is preferably at least partially disposed within the recess 80, and pushes against a radial surface 80a of the recess 80. However, the biasing member 24 may alternatively be disposed against the first axial end 14a of the inner ring 14 or otherwise engageable to bias the ring 14 axially toward the at least one intermediate ring 18. Further, the inner circumferential surface 14c of the bearing inner ring 14 is preferably slidably disposed about the outer outward-facing circumferential surface section 52 of the housing recess 26 to enable axial displacement of the inner ring 14.

Furthermore, the bearing outer ring 16 has opposing first and second axial ends 16a, 16b, respectively, and an outer circumferential surface 16c frictionally engageable with the housing inward-facing circumferential surface section 50, the second axial end 16b being disposed against the annular surface section 54 of the housing recess 26. Thereby, the bearing outer ring 16 is axially fixed within the housing recess 26. Also, each bearing intermediate ring 18 has opposing first and second axial ends 18a, 18b, respectively, the first axial end 18a being connected with or even integrally formed with the second member 2 of the mechanical assembly 3, as discussed above.

Referring particularly to FIG. 14, in an alternative construction, each one of the bearing rings 14, 16, 18 is formed of a polymeric material so as to be at least partially compressible and the bearing assembly 10 includes a combination biasing member and retainer or "biasing retainer" 90. Specifically, the biasing retainer 90 is formed with generally the same structure as the retainer 30 described above and includes an annular portion 92 with a threaded outer circumferential surface 93 and a radial flange portion 94 providing a radial surface 95 disposable against the movable one of the bearing rings 14 or 16 (shown disposed against the bearing inner ring 14). The radial flange portion 94 exerts a force, which is preferably variable, against the movable ring 14 or 16 so as to compress the raceways 15, 17, 19A and 19B.

With the above structure, the retainer threaded outer surface 93 is threadably engaged with the threaded inner circumferential surface section 29 of the housing 12 to adjustably connect the biasing retainer 90 with the housing 12, such that the preload in the bearing assembly 10 is variable. Specifically, when the annular portion 92 of the biasing retainer 90 is advanced within the housing bore 28, the force exerted by the flange portion 94 against the bearing inner ring 14 increases so as to increase the preload within each bearing set 20, 22 and 44. Alternatively, the force exerted by the flange portion 94, and thus the preload within the bearing sets 20, 22 and 44, decreases when the annular portion 92 is axially displaced outwardly from the bore 28.

The present bearing assembly 10 is clearly advantageous over previously known bearing assemblies. Being radially-nested, the axial space requirements for the bearing assembly 10 are substantially reduced, which are further minimized by the structure of the bearing rings 14, 16 and 18 having facing frustoconical surface pairs 60/64, 62/66, etc. Also, by providing the compressible biasing member 24 to establish preload and angular contact within the bearing assembly 10, the bearing assembly 10 is capable of supporting greater axial loading in comparison with known radially-nested bearings and eliminates the need for a through-shaft to establish preloading within the bearing assembly 10. Further, by positioning the at least one biasing member 24 within the recess 80 of the bearing inner ring 14, the axial compactness of the bearing assembly 10 is further increased.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A bearing assembly for movably coupling a first member and a second member and disposed within an annular space at least partially defined by a housing having a central axis, the bearing assembly comprising:
   a bearing inner ring disposed within the annular space and having an inner raceway;
   a bearing outer ring disposed about the inner ring and within the annular space, the bearing outer ring having an outer raceway;
   at least one bearing intermediate ring disposed radially between the bearing inner ring and the bearing outer ring and having an inner intermediate raceway and an outer intermediate raceway;
   a first set of rolling elements disposed between the bearing inner ring and the at least one bearing intermediate ring so as to be rollable along the inner raceway and the inner intermediate raceway;
   a second set of rolling elements disposed between the bearing outer ring and the at least one bearing intermediate ring so as to be rollable along the outer raceway and the outer intermediate raceway; and
   at least one biasing member configured to bias a movable one of the bearing inner ring and the bearing outer ring generally axially toward the other one of the bearing inner ring and the bearing outer ring so as to establish a preload within at least one of the first set of rolling elements and the second set of rolling elements,
   wherein the housing includes an annular body having a first axial end, an opposing second axial end and an annular recess extending axially inwardly from the first axial end toward the second axial end, the annular recess defining the annular space.

2. The bearing assembly as recited in claim 1 wherein the housing annular body further has an inner circumferential surface defining a central bore and an opposing outer circumferential surface and the annular recess is defined by an inward-facing circumferential surface section extending axially from the first axial end, an outward-facing circumferential surface section extending axially from the first axial end and spaced radially inwardly from the inward-facing circumferential surface section, and an annular surface extending radially between an inner edge of the outward-facing circumferential surface section and an inner edge of the inward-facing circumferential surface section.

3. The bearing assembly as recited in claim 1 further comprising a retainer connected with the housing and configured to retain the at least one biasing member within the housing recess.

4. The bearing assembly as recited in claim 3 wherein:
   the housing has a central bore with a threaded inner circumferential surface or an outer axial flange with a threaded outer circumferential section;
   the retainer includes an annular portion with a threaded outer circumferential surface threadably engaged with the threaded inner circumferential surface of the housing and a radial flange portion providing a radial retention surface or an annular portion with a threaded inner circumferential surface threadably engaged with the threaded outer circumferential surface of the axial flange of the housing and a radial flange portion providing a radial retention surface; and
   the at least one biasing member has a first axial end disposed against the retainer radial surface and a second axial end disposed against the movable one of the bearing inner ring and the bearing outer ring.

5. The bearing assembly as recited in claim 1 wherein the housing is configured to connect with or is integrally formed with the first member and the at least one bearing intermediate ring is configured to connect with or is integrally formed with the second member such that a portion of the bearing intermediate ring or a portion of the second member extends outwardly from the annular recess of the housing, at least one of the housing and the at least one bearing intermediate ring being angularly displaceable about the central axis of the housing.

6. The bearing assembly as recited in claim 1 wherein:
   the bearing inner ring is movably disposed within the annular recess, the at least one biasing member being disposed against the bearing inner ring, and the bearing outer ring is fixedly disposed within the annular recess of the housing or integrally formed with the housing; or
   the bearing outer ring is movably disposed within the annular recess, the at least one biasing member being disposed against the bearing outer ring, and the bearing inner ring is fixedly disposed within the annular recess of the housing or integrally formed with the housing.

7. The bearing assembly as recited in claim 1 wherein the at least one bearing intermediate ring is a first bearing intermediate ring, the inner intermediate raceway is a first inner intermediate raceway and the outer intermediate raceway is a first outer intermediate raceway, the first set of rolling elements being disposed between the first bearing intermediate ring and the bearing inner ring, and the bearing assembly further comprises:
   a second bearing intermediate ring disposed about the first bearing intermediate ring and including a second inner intermediate raceway and a second outer intermediate raceway, the second set of rolling elements being disposed between the second bearing intermediate ring and the bearing outer ring; and a third set of rolling elements disposed between the first bearing intermediate ring and the second bearing intermediate ring so as to be rollable along the first intermediate outer raceway and the second inner intermediate raceway;

wherein the axial biasing of the movable one of the bearing inner ring and the bearing outer ring establishes a preload within the third set of rolling elements.

8. The bearing assembly as recited in claim 1 wherein:

the bearing inner ring has a frustoconical outer circumferential surface and an annular groove extending radially inwardly and axially from the frustoconical outer circumferential surface and providing the bearing inner raceway;

the bearing outer ring has a frustoconical inner circumferential surface and an annular groove extending radially outwardly and axially from the frustoconical inner circumferential surface and providing the bearing outer raceway; and the at least one bearing intermediate ring has a frustoconical inner circumferential surface, an inner groove extending radially outwardly and axially from the inner circumferential surface and providing the inner intermediate raceway, a frustoconical outer circumferential surface and an outer groove extending radially inwardly and axially from the frustoconical inner circumferential surface and providing the outer intermediate raceway.

9. The bearing assembly as recited in claim 1 wherein the at least one biasing member includes a wave spring, a Belleville washer, a plurality of coil springs, a compressible elastomeric member or a threaded retainer.

10. The bearing assembly as recited in claim 1 wherein the bearing inner ring has an annular recess and the at least one biasing member is at least partially disposed within the annular recess of the bearing inner ring.

11. A bearing assembly comprising:

an annular housing having a central axis, a first axial end and a second axial end spaced apart along the central axis, and an annular recess extending axially inwardly from the first axial end and circumferentially about the central axis;

a bearing inner ring disposed within the annular recess of the housing and having an inner raceway;

a bearing outer ring disposed about the inner ring and within the annular recess of the housing, the bearing outer ring having an outer raceway;

at least one bearing intermediate ring disposed radially between the bearing inner ring and the bearing outer ring and having an inner intermediate raceway and an outer intermediate raceway;

a first set of rolling elements disposed between the bearing inner ring and the at least one bearing intermediate ring so as to be rollable along the inner raceway and the inner intermediate raceway;

a second set of rolling elements disposed between the bearing outer ring and the at least one bearing intermediate ring so as to be rollable along the outer raceway and the outer intermediate raceway;

at least one compressible biasing member configured to bias a movable one of the bearing inner ring and the bearing outer ring generally axially toward the other one of the bearing inner ring and the bearing outer ring so as to establish a preload within the first set of rolling elements and a preload within the second set of rolling elements; and a retainer connected with the housing and configured to retain the at least one biasing member within the annular recess of the housing.

12. The bearing assembly as recited in claim 11, wherein:

the housing has a central bore with a threaded inner circumferential surface or an outer axial flange with a threaded outer circumferential surface;

the retainer includes an annular portion with a threaded outer circumferential surface threadably engaged with the threaded inner circumferential surface of the housing and a radial flange portion providing a radial retention surface or an annular portion with a threaded inner circumferential surface threadably engaged with the threaded outer circumferential surface of the axial flange of the housing and a radial flange portion providing a radial retention surface; and the at least one biasing member has a first axial end disposed against the retainer radial surface and a second axial end disposed against the movable one of the bearing inner ring and the bearing outer ring.

13. The bearing assembly as recited in claim 11 wherein the housing is configured to connect with or integrally formed with a first member and the at least one bearing intermediate ring is configured to connect with or integrally formed with a second member such that a portion of the bearing intermediate ring or a portion of the second member extends outwardly from the annular recess of the housing, at least one of the housing and the at least one bearing intermediate ring being angularly displaceable about the central axis of the housing.

14. The bearing assembly as recited in claim 11 wherein:

the bearing inner ring is movably disposed within the annular recess of the housing, the at least one biasing member being disposed against the bearing inner ring, and the bearing outer ring is fixedly disposed within the annular recess of the housing or integrally formed with the housing; or the bearing outer ring is movably disposed within the annular recess of the housing, the at least one biasing member being disposed against the bearing outer ring, and the bearing inner ring is fixedly disposed within the annular recess of the housing or integrally formed with the housing.

15. The bearing assembly as recited in claim 11 wherein the at least one bearing intermediate ring is a first bearing intermediate ring, the inner intermediate raceway is a first inner intermediate raceway and the outer intermediate raceway is a first outer intermediate raceway, the first set of rolling elements being disposed between the first bearing intermediate ring and the bearing inner ring, and the bearing assembly further comprises:

a second bearing intermediate ring disposed about the first bearing intermediate ring and including a second inner intermediate raceway and a second outer intermediate raceway, the second set of rolling elements being disposed between the second bearing intermediate ring and the bearing outer ring; and a third set of rolling elements disposed between the first bearing intermediate ring and the second bearing intermediate ring so as to be rollable along the first outer intermediate raceway and the second inner intermediate raceway;

wherein the axial biasing of the movable one of the bearing inner ring and the bearing outer ring establishes a preload within the third set of rolling elements.

16. The bearing assembly as recited in claim 11 wherein:
the bearing inner ring has a frustoconical outer circumferential surface and an annular groove extending radially and axially inwardly from the frustoconical outer circumferential surface and providing the bearing inner raceway;
the bearing outer ring has a frustoconical inner circumferential surface and an annular groove extending radially outwardly and axially from the frustoconical inner circumferential surface and providing the bearing outer raceway; and
the at least one bearing intermediate ring has a frustoconical inner circumferential surface, an inner groove extending radially outwardly and axially from the inner circumferential surface and providing the inner intermediate raceway, a frustoconical outer circumferential surface and an outer groove extending radially inwardly and axially from the frustoconical inner circumferential surface and providing the outer intermediate raceway.

17. The bearing assembly as recited in claim 11 wherein the housing has an inner circumferential surface defining a central bore and an outer circumferential surface and the annular recess is defined by an inward-facing circumferential surface section extending axially from the first axial end, an outward-facing circumferential surface section extending axially from the first axial end and an annular surface extending radially between an inner edge of the outward-facing circumferential surface section and an inner edge of the inward-facing circumferential surface section.

18. A bearing assembly comprising:
an annular housing having a central axis, a first axial end and a second axial end spaced apart along the central axis, and an annular recess extending axially inwardly from the first axial end and circumferentially about the central axis;
a bearing inner ring disposed within the annular recess of the housing and having a frustoconical outer circumferential surface and an inner raceway provided by the frustoconical outer surface or an annular groove extending radially inwardly and axially from the from the frustoconical inner surface;
a bearing outer ring disposed about the inner ring and within the annular recess of the housing, the bearing outer ring having a frustoconical inner circumferential surface and an outer raceway provided by the frustoconical inner surface or an annular groove extending radially outwardly and axially from the frustoconical inner surface;
at least one bearing intermediate ring disposed radially between the bearing inner ring and the bearing outer ring and having a frustoconical inner circumferential surface, an inner groove extending radially outwardly and axially from the inner circumferential surface and providing an inner intermediate raceway, a frustoconical outer circumferential surface and an outer groove extending radially inwardly and axially from the frustoconical inner circumferential surface and providing an outer intermediate raceway;
a first set of rolling elements disposed between the bearing inner ring and the at least one bearing intermediate ring so as to be rollable along the inner raceway and the inner intermediate raceway;
a second set of rolling elements disposed between the bearing outer ring and the at least one bearing intermediate ring so as to be rollable along the outer raceway and the outer intermediate raceway; and
at least one biasing member configured to bias a movable one of the bearing inner ring and the bearing outer ring generally axially toward the other one of the bearing inner ring and the bearing outer ring so as to establish a preload within the first set of rolling elements and a preload within the second set of rolling elements.

19. The bearing assembly as recited in claim 18 wherein at least one of:
the bearing assembly further comprises a retainer connected with the housing and configured to retain the at least one biasing member within the annular recess of the housing; and
the housing is configured to connect with a first member and the at least one bearing intermediate ring is configured to connect with a second member such that a portion of the bearing intermediate ring or a portion of the second member extends outwardly from the annular recess of the housing, at least one of the housing and the at least one bearing intermediate ring being angularly displaceable about the central axis of the housing.

20. A bearing assembly for movably coupling a first member and a second member and disposed within an annular space at least partially defined by a housing having a central axis, the bearing assembly comprising:
a bearing inner ring disposed within the annular space and having an inner raceway;
a bearing outer ring disposed about the inner ring and within the annular space, the bearing outer ring having an outer raceway;
at least one bearing intermediate ring disposed radially between the bearing inner ring and the bearing outer ring and having an inner intermediate raceway and an outer intermediate raceway;
a first set of rolling elements disposed between the bearing inner ring and the at least one bearing intermediate ring so as to be rollable along the inner raceway and the inner intermediate raceway;
a second set of rolling elements disposed between the bearing outer ring and the at least one bearing intermediate ring so as to be rollable along the outer raceway and the outer intermediate raceway; and
at least one biasing member configured to bias a movable one of the bearing inner ring and the bearing outer ring generally axially toward the other one of the bearing inner ring and the bearing outer ring so as to establish a preload within at least one of the first set of rolling elements and the second set of rolling elements;
wherein the bearing inner ring has an annular recess and the at least one biasing member is at least partially disposed within the annular recess of the bearing inner ring.

* * * * *